United States Patent Office 2,853,093
Patented Sept. 23, 1958

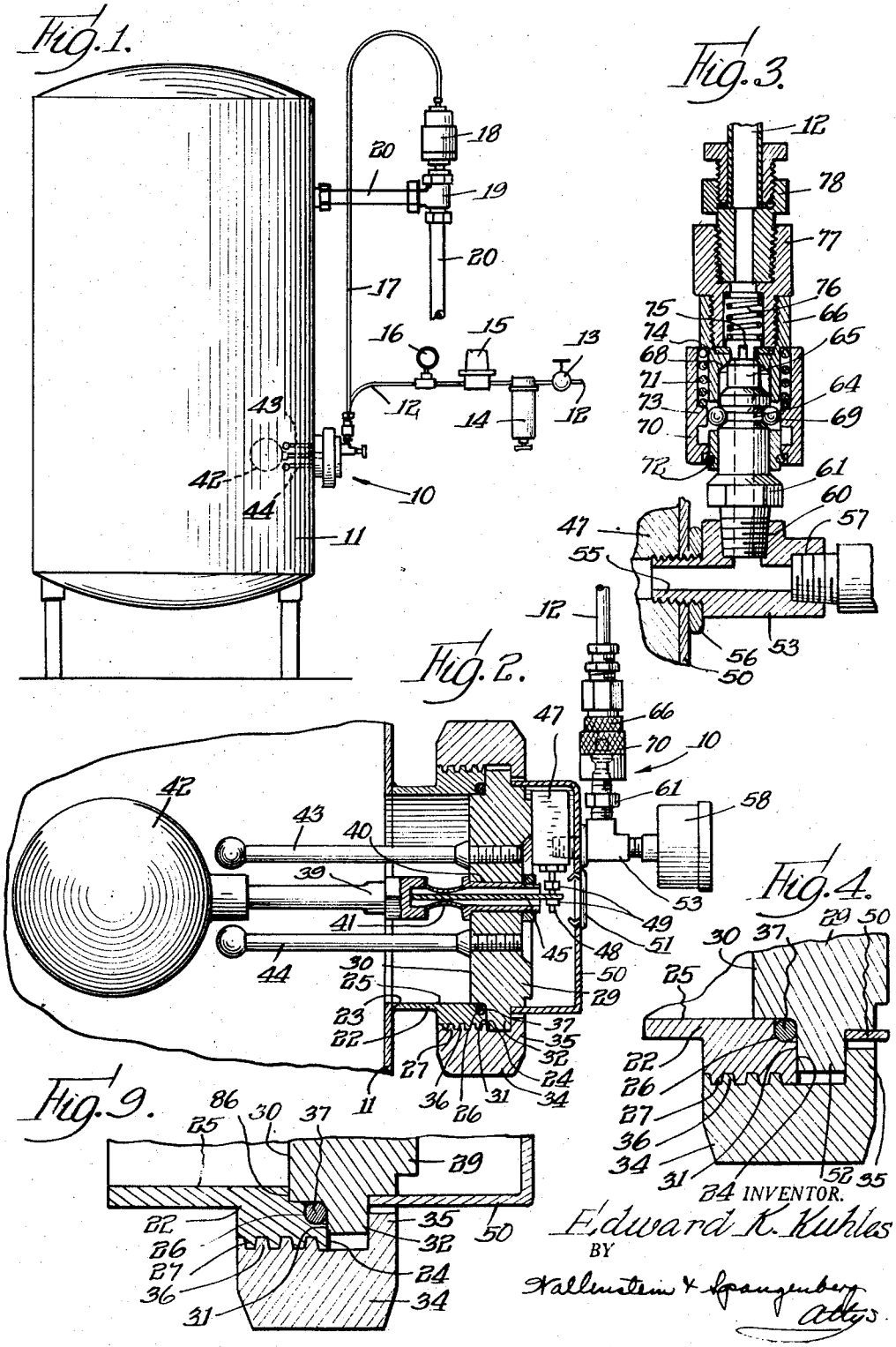

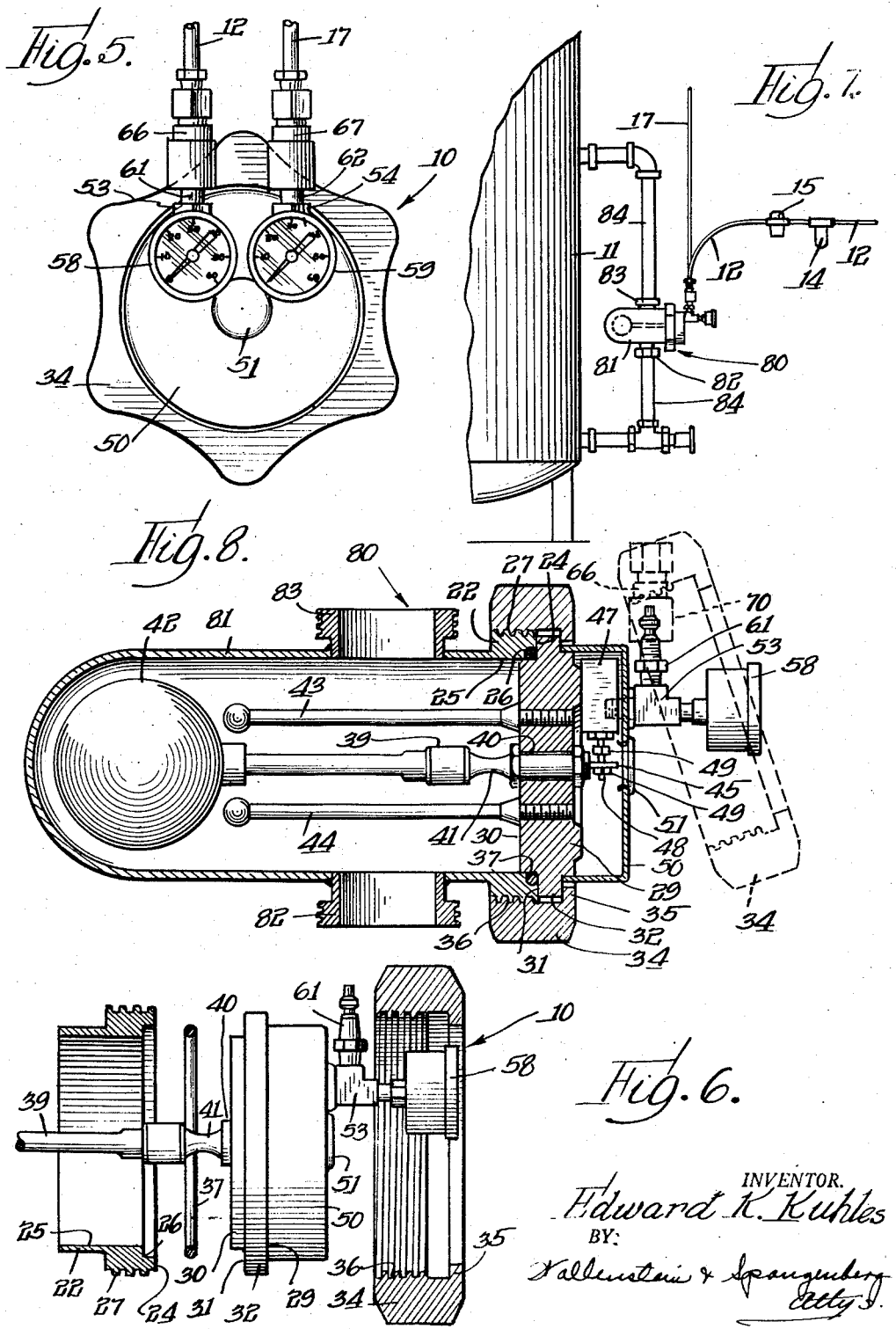

2,853,093

LIQUID LEVEL CONTROL

Edward K. Kuhles, Wilmette, Ill.

Application December 21, 1954, Serial No. 476,804

14 Claims. (Cl. 137—434)

The principal object of this invention is to provide a liquid level control device which may be readily associated with a tank or the like for responding to liquid level conditions therein, which may be quickly assembled and disassembled on the job for cleaning and sterilizing purposes, which is particularly adapted for use under sanitary conditions such as required in food processing or the like, which is simple in construction and fool proof in operation, and which may be readily adjusted on the job.

Further objects of this invention reside in the details of construction of the liquid level control and in the cooperative relationships between the component parts thereof.

Other objects and advantages of this invention will become apparent to those skilled in the art upon reference to the accompanying specification, claims and drawings, in which:

Fig. 1 is an elevational view illustrating one form of the liquid level control of this invention applied directly to a tank for responding to the liquid level therein;

Fig. 2 is an enlarged vertical sectional view of the liquid level control illustrated in Fig. 1;

Fig. 3 is a vertical sectional view through a quick disconnect fitting which is associated with the liquid level control;

Fig. 4 is an enlarged sectional view of the lower right hand portion of Fig. 2;

Fig. 5 is an end elevational view of the liquid level control looking from the right in Fig. 2;

Fig. 6 is an exploded view, partly in section, of the liquid level control illustrated in Fig. 2;

Fig. 7 is an elevational view illustrating another form of the liquid level control of this invention applied indirectly to a tank or the like for responding to the liquid level therein;

Fig. 8 is an enlarged vertical sectional view of the liquid level control illustrated in Fig. 7;

Fig. 9 is an enlarged sectional view of a modified joint which may be utilized in the liquid level controls of Figs. 1 and 7.

Referring first to Fig. 1, one form of the liquid level control of this invention is generally designated at 10 and it is shown to be applied directly to a tank 11 or the like so as to respond to liquid level conditions therein. The liquid level control 10 is preferably of the pneumatic type and in this connection air under pressure may be supplied thereto through an air supply line 12 having a shutoff valve 13, a filter 14, a pressure regulating valve 15 and a gage 16. The liquid level control 10 takes this air pressure supplied to it by the conduit 12 and regulates the pressure in a conduit 17 which extends to a pneumatic motor 18 for operating a valve 19. The valve 19 may be located in a conduit 20 for supplying liquid to the tank 11 under the control of the liquid level control 10. The arrangement so illustrated operates to maintain desired liquid level conditions within the tank 11 or the like.

Referring now to Figs. 2 to 6, the liquid level control 10 includes a ferrule 22 which is secured, as by welding, to the tank 11 about a suitable opening therein, the juncture between the ferrule 22 and the tank 11 being indicated at 23. The ferrule which is hollow is provided with an end face 24 and a cylindrical interior 25. An annular groove 26 is formed in the end face 24 and communicates with the hollow interior of the ferrule. The ferrule 22 is also provided with external screw threads 27 adjacent the end face 24. The ferrule 22 is closed by a removable closure plate 29, the closure plate having a cylindrical projection 30 extending into and guided by the hollow interior 25 of the ferrule. The closure plate 29 is provided with an end face 31 adjacent the end face 24 and with an external flange 32. A nut 34 is provided with an internal flange 35 and internal screw threads 36. A resilient torroidal O-ring formed from rubber, neoprene or the like is carried by the cylindrical projection 30 of the cover plate 29 and is received in the annular groove 26. When the cover plate 29 is placed upon the ferrule 22 and the nut 34 applied and tightened, the internal flange 35 engages the external flange 32 of the closure plate 29 to removably secure the closure plate in position on the ferrule. At the same time, the resilient torroidal O-ring is confined between the annular groove 26 of the ferrule and the cylindrical projection 30 and end face 31 of the closure plate 29 for the purpose of sealing the joint between the ferrule 22 and the closure plate 29. This arrangement provides an extremely good seal which is readily assembled and disassembled and which may be readily cleaned and sterilized so that the liquid level control of this invention may be used under sanitary conditions for processing, for example, foods and the like.

A member 39 extends inwardly from the closure plate 29 and has a hollow portion 40 permanently secured in the closure plate 29 and extending therethrough. This hollow portion 40 is crimped at 41 so that the member 39 may flex about the crimped portion 41. The inner end of the member 39 carries a float 42 which responds to the level of the liquid in the tank 11 or the like. A pair of rods or posts 43 and 44 extend inwardly from the closure plate 29 and form stops for limiting the upward and downward movement of the member 39. These posts 43 and 44 are permanently secured to the closure plate 29 in any desired manner. An actuator part 45 carried by the member 39 extends through the hollow portion 40 thereof outwardly beyond the closure wall 29 and this actuator part 45 is operated upwardly and downwardly as the float 42 moves downwardly and upwardly. Thus, it is seen that all of the parts of the control device which communicate with the interior of the tank 11 or the like are simple and straight forward and are devoid of pockets in which contamination might take place.

A control valve 47 is secured to the outer face of the closure plate 29 and it is provided with a valve actuating stem 48 which extends through the actuator part 45. Nuts 49 carried by the valve stem 48 adjustably connect the valve stem 48 to the actuator part 45 so that as the actuator part 45 is moved the valve stem 48 is correspondingly moved. A cover 50 is secured to the exterior of the closure plate 29 and covers the valve 47, the cover 50 being provided with a central opening adjacent the actuator part 45 and nuts 49 to allow adjustment of the connection between the actuator part 45 and the valve stem 48. This central hole is preferably closed by a cap 51 having spring fingers extending inwardly into the central opening for holding the same in place.

A pair of T-fittings 53 and 54 are connected to the valve 47, the T-fitting 53 being associated with the air supply line 12 and the T-fitting 54 being associated with the air control line 17. Each of these T-fittings 53 and 54 are provided with a screw threaded extension 55 which extend through holes in the cover 50 into the valve 47, a sealing gasket 56 being interposed between the T-fittings and the cover 50. The T-fittings 53 and 54 are also provided with tapped holes 57 for receiving pressure gages 58 and 59, respectively, the pressure gages indicating the pressures in the air supply line 12 and the air control line 17, respectively. The T-fittings 53 and 54 are also provided with tapped holes 60 for receiving one part 61 and 62 of quick disconnect fittings. The quick disconnect fittings may be of any conventional form, one form being illustrated in Fig. 3. Here, the part 61 is provided with an annular groove 64 and a seat portion 65. The other parts 66 and 67 of the quick disconnect fittings are provided with a seat 68 which engages the seat part 65 for sealing the two parts together when the quick disconnect fitting is connected up. The part 66 is provided with a plurality of holes which receive balls 69 which in turn are adapted to be forced into the groove 64 for securing the two parts together. A sleeve 70 is slidably mounted on the part 66 and is urged in one direction by a spring 71 into engagement with a stop 72. When the sleeve 70 is engaging the stop 72 an internal shoulder 73 in the sleeve 70 holds the balls 69 in the groove 64. When, however, the sleeve 70 is moved away from the stop 72 against the action of the spring 71 the shoulder 73 recedes away from the balls 69 so that they may move outwardly to allow the part 66 to be separated from the part 61. The part 66 is also internally provided with a seat 74 and a valve 75 urged against the seat by a spring 76. The valve 75 normally engages the seat 74 but when the disconnect fitting is connected up the valve 75 is moved off of the seat 74 by the upper end 65 of the part 61. The part 66 is provided with an extension 77 which in turn is connected by a coupling 78 to the air supply line 12 and the same construction is utilized for connecting the part 67 to the control line 17. By reason of the quick disconnect fittings the air lines 12 and 17 may be quickly connected to the T-fittings 53 and 54 and quickly disconnected therefrom without the use of tools or the like. This also facilitates assembly and disassembly of the liquid level control of this invention.

To disassemble the liquid level control 10 for cleaning and sterilizing purposes, the quick disconnect fittings are first uncoupled and then the nut 34 is removed. The nut 34 may be readily slipped over the stationary parts of the quick disconnect fittings and the gages 58 and 59, as shown more clearly in broken lines in Fig. 8. Then the closure plate 29 and the parts carried thereby may be removed from the ferrule 22, and in this connection, of course, the float 42 is of lesser transverse dimension than the internal dimension of the ferrule 22. The parts may then be cleaned and sterilized and may be readily assembled following the aforementioned procedure but in reverse order.

Another form of the liquid level control of this invention is generally designated at 80 in Figs. 7 and 8. It is essentially the same as the liquid level control 10 described above and, accordingly, like reference characters have been utilized for like parts. It differs from the liquid level control 10 in the manner in which it is connected into the tank 11 or the like for responding to liquid level conditions therein. Here, the liquid level control 80 includes a closed housing 81 in which the float 42 is located. This housing 81 is provided with fittings 82 and 83 which are connected by pipes 84 into the tank 11 or the like, the liquid level in the tank 11 corresponding to the liquid level in the housing 81. The arrangement illustrated in Figs. 7 and 8 under some circumstances is preferable to that illustrated in Figs. 1 and 2, as for example, where extreme surging conditions prevail in the tank 11. Here, the ferrule 22 is an integral part of the housing 81 and since the manner of operation of the liquid level control 80 is like that of the liquid level control 10 a further description thereof is, accordingly, not considered necessary.

Fig. 9 illustrates a modified form of joint or seal between the closure plate 29 and the ferrule 22 and this closure joint may be utilized in either of the liquid level controls 10 or 80. In Fig. 9 the ferrule 22 has a somewhat smaller inside dimension and is provided with a counter bore adjacent the annular groove 26, which counter bore terminates in an internal shoulder 86. The cylindrical projection 30 on the closure plate 29 is received in and guided by this counter bore and when the nut 34 is drawn up tight the cylindrical projection 30 preferably engages the internal shoulder 86 to eliminate the possibility of any pockets in which liquid may collect and be contaminated. Outside of this difference the constructions of Figs. 4 and 9 are the same and, therefore, like reference characters have been utilized for like parts and a further description thereof is not considered necessary.

While for purposes of illustration one basic form of this invention has been disclosed, other forms thereof may become apparent to those skilled in the art upon reference to this disclosure and, therefore, this invention is to be limited only by the scope of the appended claims.

I claim as my invention:

1. In a liquid level control for use under sanitary conditions, a liquid containing chamber having a hollow ferrule provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, and means for connecting the actuator part to the control device for actuating the latter from the former.

2. In a liquid level control for use under sanitary conditions, a liquid containing chamber having a hollow ferrule provided with an end face, external screw threads adjacent the end face, an interior counter bore terminating in a shoulder and an annular groove in the end face opening into the counter bore, a closure plate for the ferrule having an end face adjacent the end face of the ferrule, an inwardly extending cylindrical projection received in the counter bore of the ferrule and engaging the shoulder thereof and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, and means for connecting the actuator part to the control device for actuating the latter from the former.

3. In a liquid level control for use under sanitary conditions for measuring the liquid level in a tank, a housing having a hollow ferrule, means for connecting the housing to the tank so that the liquid level in the housing corresponds to the liquid level in the tank, said ferrule having an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the housing and having a float on its inner end of lesser transverse dimension than the internal dimension of the ferrule and having an actuator part extending outwardly from the closure plate and movable in accordance with the movement of the float, a control device secured to the outer side of the closure plate, and means for connecting the actuator part to the control device for actuating the latter from the former.

4. In a liquid level control for use under sanitary conditions for measuring the liquid level in a tank, a hollow ferrule secured to the tank about an opening therein and provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the tank and having a float on its inner end of lesser transverse dimension than the internal dimension of the ferrule and having an actuator part extending outwardly from the closure plate and movable in accordance with the movement of the float, a control device secured to the outer side of the closure plate, and means for connecting the actuator part to the control device for actuating the latter from the former.

5. In a liquid level control for use under sanitary conditions, a liquid containing chamber having a hollow ferrule provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, means for connecting the actuator part to the control device for actuating the latter from the former, and a pair of posts secured to the closure plate and extending inwardly therefrom and arranged above and below the member for limiting upward and downward movement thereof.

6. In a liquid level control for use under sanitary conditions, a liquid containing chamber having a hollow ferrule provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, means for connecting the actuator part to the control device for actuating the latter from the former, and a cover secured to the closure plate and covering the control device.

7. In a liquid level control for use under sanitary conditions, a liquid containing chamber having a hollow ferrule provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, adjustable means for connecting the actuator part to the control device for actuating the latter from the former, a cover secured to the closure plate and covering the control device, said cover having an opening therein to provide access to the adjustable means for adjustment of the same, and a closure cap removably secured in said cover opening.

8. In a liqiud level control for use under sanitary conditions, a liquid containing chamber having a hollow ferrule provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, means for connecting the actuator part to the control device for actuating the latter from the former, and quick disconnect fittings carried by said control device for performing liquid level control functions, the internal diameter of the flange of said nut being such as to allow removal of said nut when said fittings are disconnected.

9. In a liquid level control for use under sanitary conditions, a liquid containing chamber having a hollow ferrule provided with an end face, external screw threads adjacent the end face and an annular groove in the end face opening into the hollow ferrule, a closure plate for the ferrule having an end face adjacent the end face of the ferrule, an inwardly extending cylindrical projection received in the hollow ferrule and an external flange adjacent the end face, a resilient torroidal O-ring carried by the cylindrical projection of the closure plate and received within the annular groove of the ferrule, a nut having an internal flange engaging the external flange of the closure plate and having internal screw threads engaging the external screw threads of the ferrule for removably securing the closure plate on the ferrule and confining the O-ring between the groove in the ferrule and the projection and end face of the closure plate for sealing the joint between the same, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a pneumatic control device secured to the outer side of the closure plate, means for connecting the actuator part to the control device for actuating the latter from the former, a pair of gages carried by the pneumatic control device, and a pair of quick disconnect fittings carried by the pneumatic control device, the internal diameter of the flange of said nut being such as to allow removal of said nut over said gages and fittings when the latter are disconnected.

10. In a liquid level control, a liquid containing chamber having a hollow ferrule provided with external screw threads, a closure plate for the ferrule having an external flange, means arranged between the ferrule and the closure plate for sealing the joint therebetween, a nut having an internal flange engaging the external flange of the closure plate and having internal screw threads engaging the external screw threads of the ferrule for removably securing the closure plate to the ferrule, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, means for connecting the actuator part to the control device for actuating the latter from the former, and a pair of posts secured to the closure plate and extending inwardly therefrom and arranged above and below the member for limiting upward and downward movement thereof.

11. In a liquid level control, a liquid containing chamber having a hollow ferrule provided with external screw threads, a closure plate for the ferrule having an external flange, means arranged between the ferrule and the closure plate for sealing the joint therebetween, a nut having an internal flange engaging the external flange of the closure plate and having internal screw threads engaging the external screw threads of the ferrule for removably securing the closure plate to the ferrule, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, means for connecting the actuator part to the control device for actuating the latter from the former, and a cover secured to the closure plate and covering the control device.

12. In a liquid level control, a liquid containing chamber having a hollow ferrule provided with external screw threads, a closure plate for the ferrule having an external flange, means arranged between the ferrule and the closure plate for sealing the joint therebetween, a nut having an internal flange engaging the external flange of the closure plate and having internal screw threads engaging the external screw threads of the ferrule for removably securing the closure plate to the ferrule, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, adjustable means for connecting the actuator part to the control device for actuating the latter from the former, a cover secured to the closure plate and covering the control device, said cover having an opening therein to provide access to the adjustable means for adjustment of the same, and a closure cap removably secured in said cover opening.

13. In a liquid level control, a liquid containing chamber having a hollow ferrule provided with external screw threads, a closure plate for the ferrule having an external flange, means arranged between the ferrule and the closure plate for sealing the joint therebetween, a nut having an internal flange engaging the external flange of the closure plate and having internal screw threads engaging the external screw threads of the ferrule for removably securing the closure plate to the ferrule, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a control device secured to the outer side of the closure plate, means for connecting the actuator part to the control device for actuating the latter from the former, and quick disconnect fittings carried by said control device for performing liquid level control functions, the internal diameter of the flange of said nut being such as to allow removal of said nut when said fittings are disconnected.

14. In a liquid level control, a liquid containing chamber having a hollow ferrule provided with external screw threads, a closure plate for the ferrule having an external flange, means arranged between the ferrule and the closure plate for sealing the joint therebetween, a nut having an internal flange engaging the external flange of the closure plate and having internal screw threads engaging the external screw threads of the ferrule for removably securing the closure plate to the ferrule, a member secured and sealed to the closure plate and extending inwardly into the chamber and having a float on its inner end of lesser transverse dimension than the internal dimension of the ferrule and having an actuator part extending outwardly from the closure plate and movable in accordance with the movement of the float, a pneumatic control device secured to the outer side of the closure plate, means for connecting the actuator part to the control device for actuating the latter from the former, a pair of gages carried by the pneumatic control device, and a pair of quick disconnect fittings carried by the pneumatic contact device, the internal diameter of the flange of said nut being such as to allow removal of said nut over said gages and fittings when the latter are disconnected.

References Cited in the file of this patent

UNITED STATES PATENTS

| | | |
|---|---|---|
| 1,278,910 | Gregory | Sept. 17, 1918 |
| 1,773,375 | Rice | Aug. 19, 1930 |
| 1,889,886 | Dawson | Dec. 6, 1932 |
| 2,230,515 | Pieper | Feb. 4, 1941 |
| 2,365,649 | Shaw | Dec. 19, 1944 |
| 2,452,690 | Wolfram | Nov. 2, 1948 |
| 2,532,669 | Jones | Dec. 5, 1950 |
| 2,626,594 | Kimmell | Jan. 27, 1953 |